Figures 1, 2:
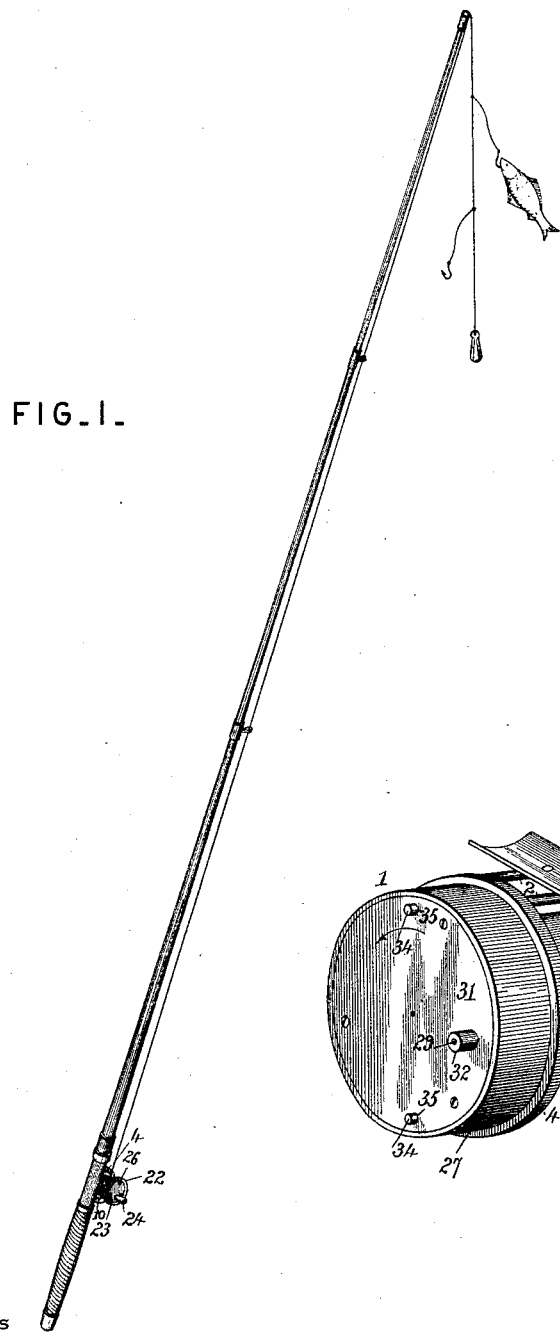

(No Model.) 2 Sheets—Sheet 1.
G. E. MEDLEY.
FISHING REEL.

No. 481,330. Patented Aug. 23, 1892.

Witnesses
Jas. K. McLathran
Chas. S. Hyer

Inventor
Granville E. Medley
By his Attorneys,
C. A. Snow & Co.

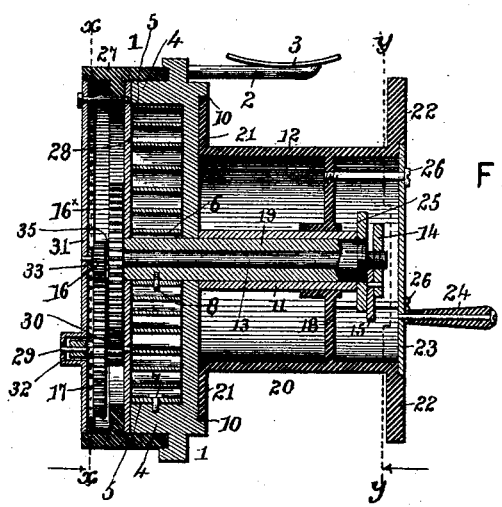

UNITED STATES PATENT OFFICE.

GRANVILLE EUSTACE MEDLEY, OF HOPKINSVILLE, KENTUCKY.

FISHING-REEL.

SPECIFICATION forming part of Letters Patent No. 481,330, dated August 23, 1892.

Application filed May 3, 1892. Serial No. 431,685. (No model.)

*To all whom it may concern:*

Be it known that I, GRANVILLE EUSTACE MEDLEY, a citizen of the United States, residing at Hopkinsville, in the county of Christian and State of Kentucky, have invented a new and useful Fishing-Reel, of which the following is a specification.

This invention relates to fishing-reels; and it consists in the construction and arrangement of the parts thereof, as will be more fully hereinafter described and claimed.

The object of the invention is to provide an automatically-operating reel which may be set for the purpose of a drag and operate without attention from the angler and wherein the parts are simple and effective in their construction and operation, strong and durable, convenient, and comparatively inexpensive in manufacture.

In the drawings, Figure 1 is a perspective view of a rod with the reel applied in connection therewith. Fig. 2 is a detail perspective of the reel detached. Fig. 3 is a longitudinal vertical section of the same. Fig. 4 is a view similar to that shown in Fig. 3, partially broken away and at an angle to said Fig. 3. Fig. 5 is an elevation of the inside of the drum-head. Fig. 6 is a section on the line $x\,x$, Fig. 3. Fig. 7 is a section on the line $y\,y$, Fig. 3.

Similar numerals of reference indicate corresponding parts in the several views.

Referring to the drawings, the numeral 1 designates the body of the reel, and to this is rigidly fastened in a suitable manner two horizontally-disposed bars or posts 2, to which is secured the seat-plate 3, adapted to engage the reel-seat of the rod. The body 1 is turned outwardly, as at 4, in the form of a flange and has a deep countersink 5, in which is located the main or actuating spring 6. The outer end of the said spring is hooked to the said body by having a hole formed at the outer end thereof, which engages a pin 7. The inner end of said spring is fastened to a hook 8 on the sleeve of the drum, as will be more fully hereinafter described. In the flange surrounding the countersink 5 of the said body a number of holes 9 are drilled or otherwise formed, which extend circumferentially around the same. The flange 4 surrounding the countersink 5 is sufficiently wide to protect the spring, and the countersink of itself extends beyond the central portion of the body for the purpose of concealing as much of the spring as possible and in order to make the parts of compact form by reducing them in width, thereby producing a neat appearance. The inner side of the body projects to let the main spring as far in as possible to accomplish the result stated, and it is countersunk slightly, as at 10, to protect the inner edge of the spool of the reel and make it dust and dirt proof. To the center of the body is rigidly fastened a tubular spindle 11 for the spool 12, the latter having free revolution on said spindle. Through the spindle from the opposite end to that in which the spool works passes a shaft 13, the end of which projects beyond the end of the spindle, and to which is secured an oblong nut 14, to which is swiveled an eccentric or clutch 15. At the opposite end of the shaft is a pinion 16, with which the outer cog-wheel 17 meshes and turns when the drum containing the spring is being turned either in winding the reel up or while it is in operation. The spool 12 is preferably made of vulcanized rubber and has a web 18 therein supporting a tubular bearing 19, of metal. It will be seen that the middle portion of the said drum is made of considerable width, as at 20, in order to provide for a winding of the requisite number of yards of line thereon with the fewest number of revolutions of the same; but it will be readily apparent that the said spool and the reel entire may be made of aluminum or any other material. The inner end of the spool is formed with a flange 21 to fit into the countersink 10 of the drum, and the outer end of said spool is formed with a larger flange 22, in which is removably fitted a plate 23, having a crank-handle 24, by which the wheel may be turned by hand. The eccentric or clutch 15 has movement between the oblong nut or tap 14, to which it is pivoted, and a broad cap 25, that holds the spool in position. The said eccentric actuates the reel by engaging one of the screws 26 employed to hold the cap or plate 23 of the spool in position. The form of the eccentric or clutch is substantially that of a crescent and is formed with a flat side, which bears against the broad cap which holds the spool in place, and a straight edge engages one of the screws, as aforesaid. The drum 27 is formed with flanges, one of which fits over the flange or outward extension 4 of the body 1, and the other flange extends interiorly and has a partition-plate 28 secured thereto, which supports a post 29 to receive the cog-wheel 17, which is provided with a pinion 30, which meshes with the central cog 16, secured on the end of the shaft 13. This cog-wheel 17 has the function of an idler to prevent too-rapid play or action of the spring, as will be readily understood. The drum receives a cap or closing plate 31, which is formed with a socket 32, fitting over the post 29 and a portion of the bearing of the cog-wheel 17, and also has a spring-strip 33, which is centrally secured to the said plate 31 and has the ends thereof free. The ends of the said spring 33 have posts or pins secured thereto, as at 34, and said posts or pins extend partially inward and through openings 35 of the drum-casing to engage the openings or holes 9 in the body 1, and the remaining portion of the said posts or pins project outward through the plate 31 and form push-heads for exterior engagement in operating the reel. These pins or posts are employed for holding the spring in wound position when the reel is set for automatic operation.

The reel is entirely automatic and provides an improved device for casting the line from the reel with perfect ease and accuracy and to wind it up automatically. In other words, the reel is entirely automatic both in casting the line and in winding the latter up, and also in setting and making the drag, so that when a fish is hooked it will put the reel in operation whether the angler is present or not. It is also a crank or handle reel and may be so operated independent of the spring attachment, which is a convenient arrangement.

It will be understood that the eccentric or clutch 15 is freely movable, owing to its pivotal connection, and that it is braced at its ends when in locking position by bearing against the shaft 13 under the nut 14 and one of the screws 26, respectively. In operation this clutch holds the spool against movement when the spring in the drum is wound and before said spring is released, to thereby obviate and prevent rotation of the spool when not desired and unwinding of the line therefrom when the reel is set to wind up the slack line after a cast is made. The loose mounting of said clutch, together with the crescent shape or outer curved form thereof, permits a free rotation thereof in the spool in a direrection reverse to its locking position and allows it to freely pass the screws or bolts 26. This latter operation takes place during winding in of the slack line.

In operating with a fishing-rod having the improved reel attached thereto, which normally is located under the rod, the finger or fingers of the left hand are placed on the outer flange of the spool. Then with the thumb and fingers of the right hand the drum 27 is wound up by turning the same in the direction of the arrow thereon. At the conclusion of six or more windings the drum is stopped by pressing with the thumb of the left hand on one of the pins or posts at 34, which will engage one of the holes 9 in the body 1, and thereby hold the said drum against movement. When the drum is thus fastened while winding it up, the spool which holds the line will run entirely independent of the other parts of the reel, thereby permitting the angler to cast from the reel with perfect ease.

In casting the line from the reel the rod is grasped with the right hand at the point where the reel is located, and the thumb of the right hand is placed on the outer edge of the spool and with gentle pressure, and in this manner the cast may be easily and readily made. After the cast has been made it often becomes necessary to wind up slack line, and to accomplish this operation the drum is turned slightly in the same direction as when winding it up, which permits the post or pin, as at 34, to become disengaged, thereby causing the reel to wind automatically through the influence of the spring in the body 1. When a fish is hooked, it is landed by placing the thumb of the right hand on the outer edge of the spool to keep it from turning, and the rod is then pulled to draw the line in as far as possible. The spool is then released and revolves automatically to take up the slack line for another hold, and this operation becomes successive until a proper landing is made.

The next important feature is the setting of the drag. It is often necessary for the angler to leave his rod for various reasons, and in his absence should a fish get hooked it is necessary to have a drag to the reel to prevent it from running off too easily. To set the drag after the reel has been wound up, one of the posts or pins is pressed inward while the drum turns in the opposite direction from winding. This is one form; but the preferable manner in which it can be done is to pull the line and at the same time stop the drum, which will leave the latter set, so that when the fish gets hooked it will throw the reel in operation, and thereby produce a stout drag and cause the winding of the slack line as fast as the fish can make it, and after the fish is entirely broken down the reel will wind it in automatically.

Projecting outward from the shaft 13, at the end thereof adjacent to the pinion 16, are spring-arms 35', integrally formed with a central collar 36, fitted over the end of said shaft. Said arms 35' bear on the cog $16^\times$ and act to hold the eccentric or clutch on the opposite end of the shaft in proper position.

Having thus described the invention, what is claimed as new is—

1. In a fishing-reel, the combination of a spool on which the line is wound, a body having a tubular spindle on which said spool is rotatably mounted, said body and spool being independent, a spring secured within said body, a drum or casing surrounding said spring and body, and a shaft carrying an eccentric or clutch in said spool adapted to bear against one of the connecting-screws of the parts and control the movements of the said spool, said eccentric or clutch consisting of a crescent-shaped plate pivoted at one point only and extended from said shaft, substantially as described.

2. In a fishing-reel, the combination of a spool, a body having a tubular spindle extending therefrom, a spring having its outer end connected with said body, a winding-drum having the inner end of the spring secured thereto, a shaft fitted in said tubular spindle, an eccentric or clutch secured on one end of said shaft and engaging one of the connecting-screws of the said spool, an oblong nut secured to said shaft and to which said eccentric or clutch is pivotally connected and extends therefrom, and a spring connected to and extending transversely across the opposite end of said shaft and adapted to hold the eccentric in position, substantially as described.

3. In a fishing-reel, the combination of a spool, a body having a tubular spindle extending therefrom and on which said spool has rotatable bearing and also povided with an outer covering-plate, a spring in connection with the said body, the said body having a series of holes therein, and pins or posts on the free ends of a transversely-arranged spring movably connected to the inner surface of the said outer plate and adapted to engage the said holes of the body, a shaft extending through said spindle into said spool, and an eccentric or clutch pivotally supported by said shaft in said spool, the said clutch or eccentric being free to move and connected at its inner end portion only, substantially as described.

4. In a fishing-reel, the combination of a spool, a body having a hollow spindle projecting therefrom and provided with a series of holes, as set forth, a spring connected to said body and located in a countersink therein, a winding-drum secured to said spring, a shaft extending through said tubular spindle and having an eccentric or clutch on one end thereof in the said spool and adapted to bear against one of the connecting-screws of said parts, a pinion on the opposite end of the same, a spring extending transversely through the end of the shaft, an idler-wheel, and an outer plate fitted over the drum, having a spring secured thereto carrying pins or posts at the ends thereof to engage the holes in said body and lock the drum against movement, and said eccentric or clutch being freely movable and pivoted at one point only, substantially as and for the purpose set forth.

In testimony that I claim the foregoing as my own I have hereto affixed my signature in the presence of two witnesses.

GRANVILLE EUSTACE MEDLEY.

Witnesses:
GEO. C. LONG,
BAILEY RUSSELL.